(12) United States Patent
Madmoni

(10) Patent No.: US 12,403,414 B2
(45) Date of Patent: Sep. 2, 2025

(54) METHOD FOR SEPARATION OF PARTICLES SUSPENDED IN A FLUID

(71) Applicant: Filter Art, Metula (IL)

(72) Inventor: Shahar Madmoni, Givatayim (IL)

(73) Assignee: Filter Art, Metula (IL)

( * ) Notice: Subject to any disclaimer, the term of this patent is extended or adjusted under 35 U.S.C. 154(b) by 0 days.

(21) Appl. No.: 18/731,664

(22) Filed: Jun. 3, 2024

(65) Prior Publication Data

US 2024/0316479 A1 Sep. 26, 2024

Related U.S. Application Data

(62) Division of application No. 16/491,065, filed as application No. PCT/IL2018/050250 on Mar. 6, 2018, now Pat. No. 12,023,605.

(30) Foreign Application Priority Data

Mar. 8, 2017 (IL) .......................................... 251036

(51) Int. Cl.
*B01D 21/26* (2006.01)
*B01D 21/00* (2006.01)
(Continued)

(52) U.S. Cl.
CPC ....... *B01D 21/265* (2013.01); *B01D 21/0012* (2013.01); *B01D 21/01* (2013.01);
(Continued)

(58) Field of Classification Search
CPC .. B01D 21/265; B01D 21/0012; B01D 21/01; B01D 21/26; B01D 2221/10; C02F 9/00;
(Continued)

(56) References Cited

U.S. PATENT DOCUMENTS 1,836,758 A 12/1931 Knapp
4,001,121 A 1/1977 Bielefeldt
(Continued)

FOREIGN PATENT DOCUMENTS

DE 2929139 A1 1/1981
EP 1942329 A2 7/2008
(Continued)

OTHER PUBLICATIONS

Wakeman, R.J., "Liquid Solid Separation", Feb. 11, 2011.

*Primary Examiner* — Waqaas Ali
(74) *Attorney, Agent, or Firm* — Ballard Spahr LLP

(57) ABSTRACT

A system and method are provided for producing from a first fluid having particles of a substance suspended or dissolved therein with a first concentration of the substance, a second fluid having a second concentration of the substance lower than the first concentration and a separated-fluid product, in which concentration of the substance is greater than that in the first fluid. The system comprises a pre-treatment module for processing the first fluid to produce aggregates from the substance and at least one separation duct in fluid communication with an outlet of the pre-treatment module, the duct having at least one bay portion having such design as to cause aggregates to accumulate along a pre-determined wall of the bay portion, thereby facilitating separation between the second fluid and the separated-fluid product.

11 Claims, 7 Drawing Sheets

(51) Int. Cl.
  *B01D 21/01* (2006.01)
  *C02F 9/00* (2023.01)
  *C02F 1/00* (2023.01)
  *C02F 1/38* (2023.01)
  *C02F 1/52* (2023.01)

(52) U.S. Cl.
  CPC ............. *C02F 9/00* (2013.01); *C02F 1/001* (2013.01); *C02F 1/385* (2013.01); *C02F 1/52* (2013.01)

(58) Field of Classification Search
  CPC . C02F 1/001; C02F 1/385; C02F 1/52; G01N 15/0255; G01N 2015/0053; B01L 2200/0668; B01L 2400/0409; B01L 3/502753; B03B 5/32; B03B 5/00
  See application file for complete search history.

(56) References Cited

U.S. PATENT DOCUMENTS

| | | |
|---|---|---|
| 4,343,707 A | 8/1982 | Lucas |
| 4,383,917 A | 5/1983 | Wells |
| 4,390,351 A | 6/1983 | Matsui et al. |
| 4,848,991 A | 7/1989 | Bielefeldt |
| 4,895,652 A | 1/1990 | Cornelissen |
| 5,248,421 A | 9/1993 | Robertson |
| 8,276,760 B2 | 10/2012 | Lean et al. |
| 8,647,479 B2 | 2/2014 | Lean et al. |
| 8,869,987 B2 | 10/2014 | Lean et al. |
| 8,875,903 B2 | 11/2014 | Lean et al. |
| 8,931,644 B2 | 1/2015 | Lean et al. |
| 2008/0128331 A1 | 6/2008 | Lean et al. |
| 2008/0290048 A1 | 11/2008 | Jaeggi et al. |
| 2009/0001436 A1 | 1/2009 | Kondo |
| 2009/0114607 A1 | 5/2009 | Lean et al. |
| 2009/0283455 A1 | 11/2009 | Lean et al. |
| 2010/0031432 A1 | 2/2010 | Lappalainen |
| 2011/0108491 A1 | 5/2011 | Lean et al. |
| 2012/0318719 A1 | 12/2012 | Lean et al. |
| 2014/0367348 A1 | 12/2014 | Volkel et al. |
| 2014/0367349 A1 | 12/2014 | Volkel et al. |
| 2015/0066956 A1 | 3/2015 | Chae et al. |
| 2015/0165347 A1 | 6/2015 | Nichols et al. |
| 2015/0166956 A1 | 6/2015 | Puleo et al. |
| 2015/0238963 A1 | 8/2015 | Han et al. |
| 2015/0290369 A1 | 10/2015 | Hamman |

FOREIGN PATENT DOCUMENTS

| | | | |
|---|---|---|---|
| EP | 2058284 A1 * | 5/2009 | ............. B01D 21/01 |
| EP | 2378266 A1 | 10/2011 | |
| EP | 2946821 A1 | 11/2015 | |
| FR | 2918900 A1 | 1/2009 | |
| GB | 499024 A | 1/1939 | |
| GB | 2130913 A | 6/1984 | |
| SU | 639578 | 12/1978 | |
| TW | 201509508 A | 3/2015 | |
| WO | 9609103 A1 | 3/1996 | |
| WO | 2008130977 A2 | 10/2008 | |
| WO | WO-2009024678 A2 * | 2/2009 | ......... B01D 21/0039 |
| WO | 2010115025 A2 | 10/2010 | |

* cited by examiner

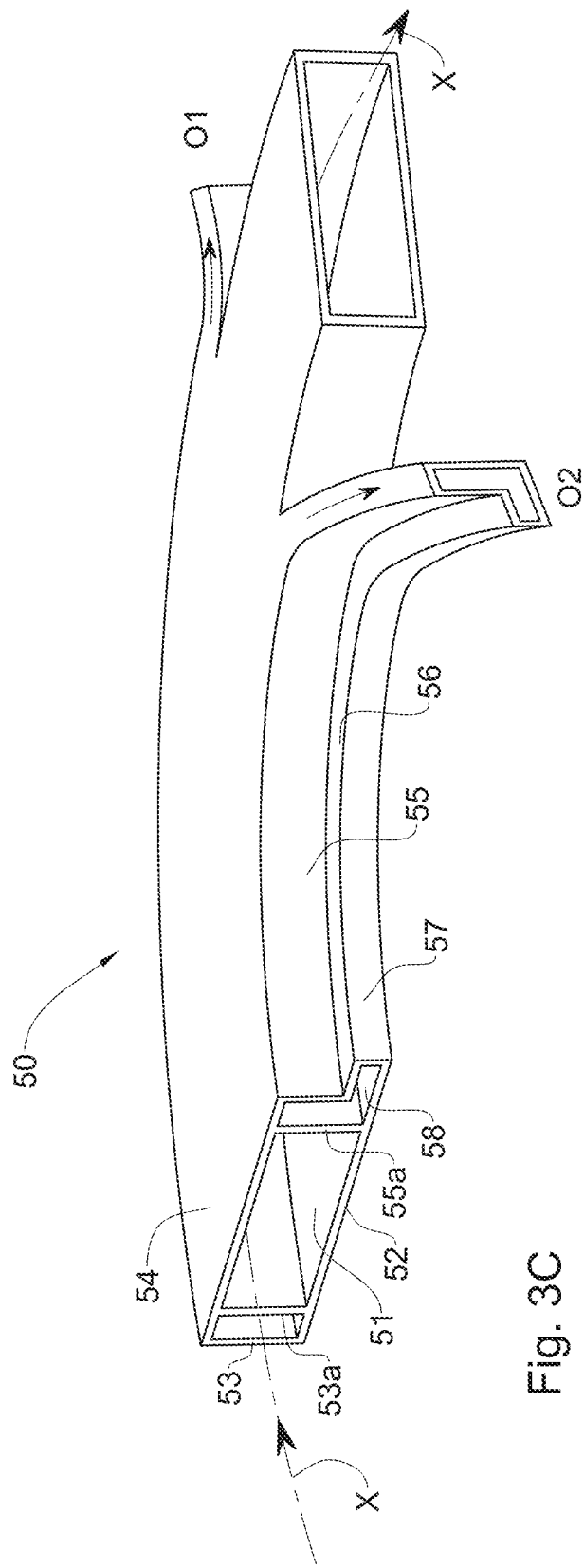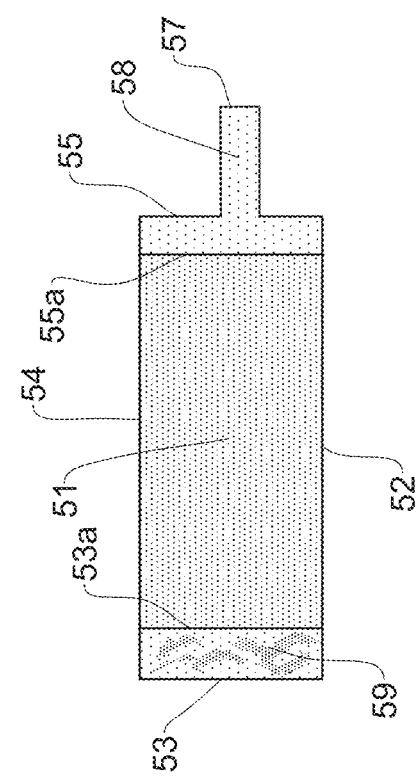
Fig. 3C
Fig. 3D

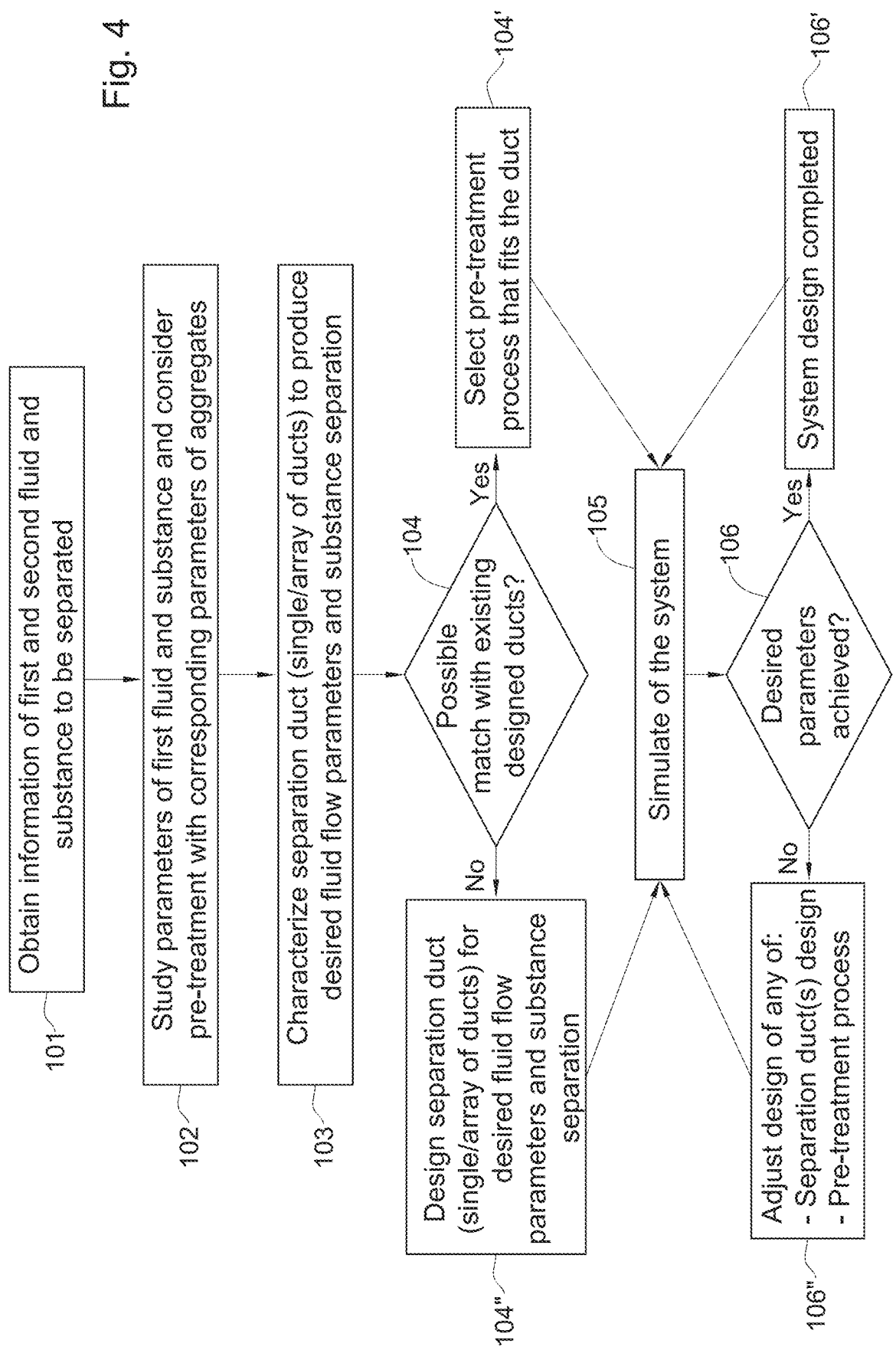

METHOD FOR SEPARATION OF PARTICLES SUSPENDED IN A FLUID

TECHNOLOGICAL FIELD

The presently disclosed subject matter refers to the field of separating particles of a substance suspended or dissolved in a fluid having a first concentration of the substance, using inter alia a separation duct, so as to produce from said fluid a fluid having a second concentration of said substance lower than the first concentration, and a separated-fluid product, in which concentration of said substance is greater than that in the first fluid.

BACKGROUND

WO 2010/115025 is one example of a publication referring to the above field, and it discloses blood cells sorting within a micro-channel separation device, wherein the blood is pre-treated prior to such sorting.

GENERAL DESCRIPTION

In accordance with one aspect of the presently disclosed subject matter, there is provided a system for producing from a first fluid having particles of a substance suspended or dissolved therein with a first concentration of said substance, a second fluid having a second concentration of said substance that is lower than the first concentration and a third fluid having a third concentration of said substance higher than the first concentration.

The term "first fluid" should be understood to encompass any type of fluid from any type of source (e.g. city sewage, household sewage, industrial sewage, municipal wastewater, industrial wastewater, groundwater, sea water, and any combinations thereof) comprising particles of a substance suspended or dissolved therein, wherein said substance has a first concentration. Said concentration, i.e. the amount of substance in a given volume of said fluid, may be a molar concentration, mass concentration or volume concentration of the substance in a volume unit of said first fluid. Said first fluid is introduced into the system of the invention.

The term "second fluid" as defined herein above and below, should be understood to relate to any fluid which egresses from the system of the presently disclosed subject matter and has the second concentration of said substance which is lower than the first concentration.

The third fluid will be referred to in the description and claims as a 'separated-fluid product', which should be understood to relate to any fluid which egresses from the system of the presently disclosed subject matter and has the third concentration, which is higher than the first concentration.

The system of the presently disclosed subject matter comprises at least one pre-treatment module configured for pre-treating said first fluid to produce aggregates from said particles in the first fluid and thereby produce a pre-treated fluid, and at least one separation duct configured for producing from said pre-treated fluid said second fluid having lower concentration of said substance as compared with first fluid and said separated-fluid product having a third concentration of said substance higher than the first concentration.

Said at least one pre-treatment module comprises:
a pre-treatment inlet, via which the first fluid can be introduced into said module;
at least one chamber for processing the first fluid to produce aggregates from said substance;
a pre-treatment outlet for outputting from said module the pre-treated fluid comprising said aggregates.

The term "aggregate" should be understood to relate to a cluster, body or mass formed by the collection of particles of said substance.

Such aggregate can be formed by any aggregation process resulting in the increase of at least one of the following parameters which the formed aggregates will have relative to the corresponding parameters of the particles in the first fluid: average mass and size. Wherein the term "size" refers to the diameter of a representative spherical volume in which an aggregate can be inscribed.

Examples of aggregation processes suitable for forming the aggregate from said particles of the first fluid include, but are not limited to: deposition, flocculation, precipitation, coagulation (and any combinations thereof) of the particles of the first fluid.

Said pre-treatment module can comprise at least one chamber for processing the first fluid to produce said pre-treated fluid with the aggregates. Thus, in some embodiments, said at least one chamber can further comprise at least one inlet via which at least one pre-treatment agent capable of forming aggregates from said particles is introduced. In some embodiments, said at least one pre-treatment agent is selected from at least one coagulating agent, at least one flocculating agent, at least one precipitating agent or a mixture thereof. In other embodiments, said at least one chamber can further comprise means for forming aggregates from said particles selected from means for changing the temperature of said first fluid in said at least one chamber, means for exposing said first fluid to radiation (UV, IR, microwave, and so forth), means for exposing said first fluid to electricity, means for exposing said first fluid to magnetic fields, means for exposing said first fluid to kinetic energy and means for exposing said first fluid to soundwaves.

Examples of typical aggregating agents, such as precipitating agents, coagulating agents and flocculating agent can be found in: Coagulants and Flocculants: Theory & Practice, Jun. 1, 1995, by Yong H. Kim The 2018-2023 World Outlook for Organic Flocculants, Feb. 7, 2017, by Icon Group International. Polymer Flocculant: For Industrial Waste Water Treatment, Nov. 26, 2012, by Mamta Saiyad. Flocculant: Webster's Timeline History, 1961-2007 Mar. 10, 2010, by Icon Group International. Flocculant, 1991, by HU YONG YOU GAO BAO YU. Wastewater Treatment: Preparation & Characterization & Evaluation of Organic Flocculant, Apr. 15, 2016, by Amal Aly. Preliminary studies on the dewatering of coal-clay waste slurries using a flocculant, Jan. 1, 1982, by Jalna R. Zatko.

In some embodiments, wherein said particles of a substance are dissolved in said first fluid, the pre-treatment module can be configured to produce aggregates by precipitating said dissolved particles and then aggregating them to form said aggregates. In other embodiments, wherein said particles of a substance are suspended or dispersed in said first fluid, said processing of the first fluid to produce aggregates in said pre-treatment module comprises aggregating them to form said aggregates.

In some embodiments said pre-treatment module can further comprise at least one filtering unit configured for filtering out particles of predetermined size or mass from the pre-treated fluid prior to the egress of the pre-treated fluid from the pre-treatment module.

In further embodiments, said pre-treatment module can further comprise at least one mixing unit, wherein said first fluid is mixed, for example, with at least one pre-treatment agent. In some embodiments, said at least one mixing unit can comprise at least one static mixer. In other embodiments, said at least one mixing unit comprises at least one mixing pipe.

Said at least one separation duct of the system of the presently disclosed subject matter comprises:
  a duct inlet in fluid communication with said pre-treatment outlet for receiving therein said pre-treated fluid; and
  at least one bay portion extending at least partially along a curved central line defining a fluid flow direction; said bay portion comprising a main channel and at least one bay channel coextensive with the main channel; in a cross-section of the bay portion taken perpendicularly to said central line, the main channel has at least four channel walls and the bay channel protrudes from at least one of the channel walls and has bay channel walls generally parallel to the corresponding walls of the main channel oriented in the same way, the area of said bay channel in said cross-section being smaller than that of the main channel; the geometry and location of the bay channel relative to the main channel being such as to cause the aggregates to accumulate along a pre-determined wall of the bay portion, thereby facilitating separation between said second fluid and the separated-fluid product, in which concentration of said aggregates is greater than that in the pre-treated fluid.

In accordance with another aspect of the presently disclosed subject matter, there is provided a method for producing from a first fluid having particles of a substance, suspended or dissolved therein with a first concentration of said substance, a second fluid having a second concentration of said substance lower than the first concentration and a third fluid in the form of a separated-fluid product having a third concentration of said substance higher than the first concentration, the method comprising:
  (a) providing a separation duct having a geometry suitable to receive and pass therethrough a fluid comprising aggregates of a predetermined range of sizes, masses or inscribing volumes, so as to produce from said fluid said second fluid and a separated-fluid product, in which concentration of the substance in said aggregates is greater than that in said pre-treated fluid
  (b) performing prior to step (a) the following steps:
    producing a pre-treated fluid comprising aggregates of said size from said particles by pre-treating said first fluid;
    feeding said pre-treated fluid into said separation duct and letting it pass therealong so as to produce from said pre-treated fluid said second fluid and said separated-fluid product.

When relating to the process of producing the pre-treated fluid comprising aggregates from said particles of the first fluid, such process can include any type of aggregation processes that are able to aggregate said particles (whether dissolved, dispersed or suspended in first fluid) so that the sizes, masses or inscribing volumes of the produced aggregates will be greater than the corresponding parameter of said particles in said first fluid. Such processes can include, but are not limited to precipitation, coagulation, flocculation, and any combinations thereof.

Said aggregation process can be achieved via reacting said particles of said first fluid with at least one pre-treatment agent capable of forming aggregates from said particles. In some embodiments, said at least one pre-treatment agent can be selected from at least one coagulating agent, at least one flocculating agent, at least one precipitating agent or a mixture thereof. Alternatively or in addition, said aggregation process can include changing the temperature of said first fluid (either heating or cooling in comparison with the temperature of said first fluid upon entering said pre-treatment module), exposing said first fluid to radiation (UV, IR, microwave, and so forth), means for exposing said first fluid to electricity, means for exposing said first fluid to kinetic energy, means for exposing said first fluid to magnetic fields and means for exposing said first fluid to soundwaves.

In some embodiments, wherein said particles of a substance are dissolved in said first fluid, said processing of the first fluid to produce aggregates in said pre-treatment module can comprise precipitating said dissolved particles and then aggregating them to form said aggregates. In other embodiments, wherein said particles of a substance are suspended or dispersed in said first fluid, said processing of the first fluid to produce aggregates in said pre-treatment module comprises aggregating them to form said aggregates.

In some embodiments, said process of producing a pre-treated fluid can further comprise at least one filtering step, wherein particles of predetermined size or mass of said first fluid are filtered out prior to said feeding the pre-treated fluid into said separation duct.

In further embodiments, said process of producing a pre-treated fluid can further comprise at least one mixing step, wherein said first fluid is mixed, for example with at least one pre-treatment agent. In some embodiments, said mixing step is performed with at least one static mixer. In other embodiments, said at least one mixing step is performed with at least one mixing pipe.

The system and method according to the above aspects of the presently disclosed subject matter, and each of their components/steps, can comprise further features presented in the detailed description and/or defined in the claims.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 3C is a schematic illustration of one example of a partitioned portion of a separation duct, which can be used in the system of FIG. 1;

FIG. 3D is a schematic cross-sectional view of the partitioned portion shown in FIG. 3C;

FIG. 4 is a block-diagram schematically illustrating an example of a method, by which a separation system shown in FIG. 1 can be designed;

DETAILED DESCRIPTION OF THE DRAWINGS

Figure 1:
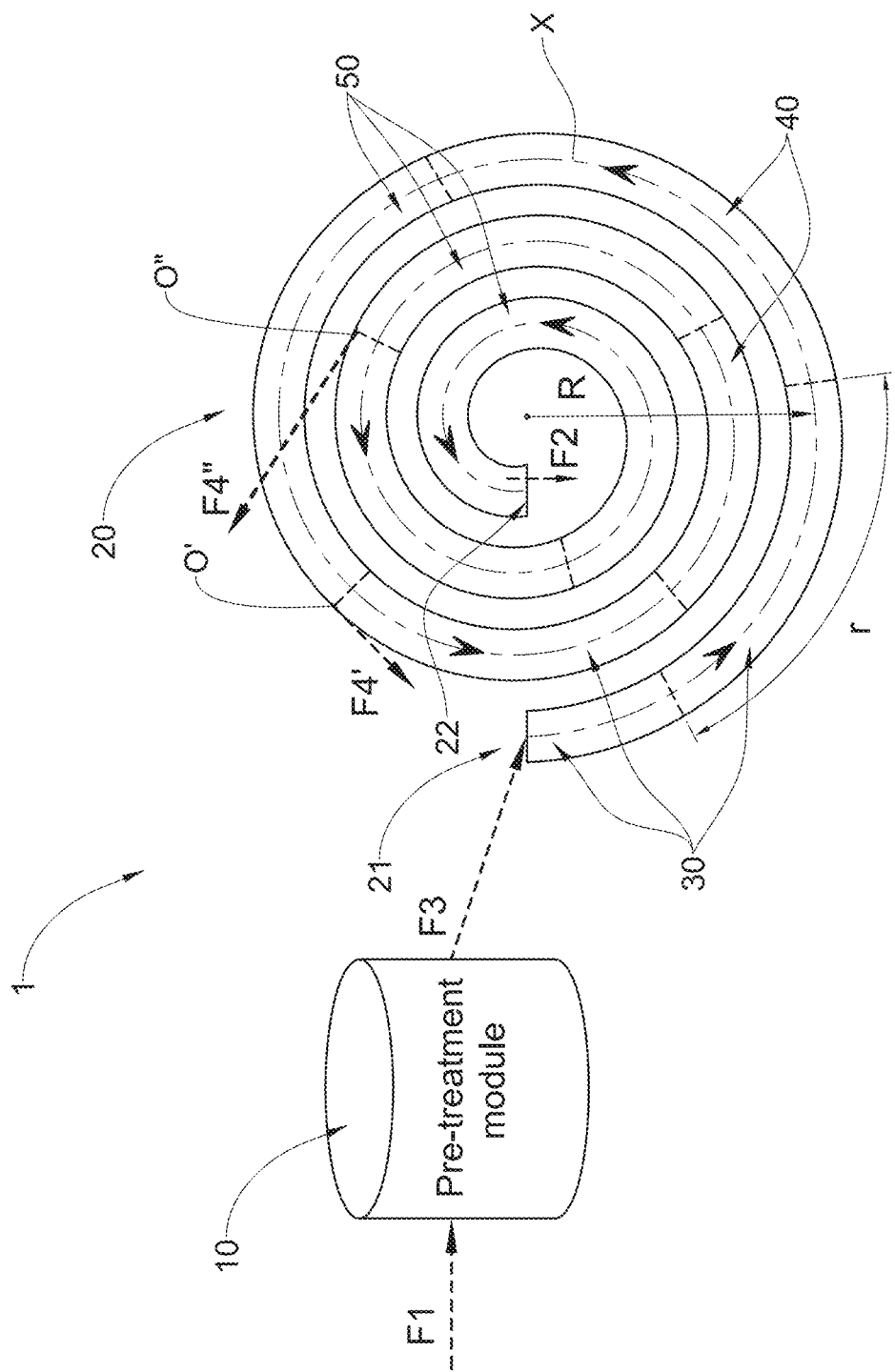
FIG. 1 is a schematic illustration of a separation system according to one embodiment of the presently disclosed subject matter.

FIG. 1 illustrates a particle separation system 1, according to one example of the presently disclosed subject matter, for receiving there in an incoming first fluid F1, having pre-identified particles of substance suspended or dissolved therein with a first concentration C1 of this substance, and producing a second fluid F2, having a second concentration C2 of the above substance substantially less than C1, in accordance with a desired value of a ratio C2:C1. The above substance will be referred to in the present description and claims as 'the substance' or 'the particles substance'.

As shown in FIG. 1, the system 1 generally comprises a pre-treatment module 10 for performing a pre-treatment of the first fluid F1, operable to increase the size of the pre-identified particles and/or bond them to each other, thereby forming aggregates from at least a part of the particles, and producing a pre-treated fluid F3 comprising these aggregates and, possibly, the remaining particles, with a third concentration C3 of the particles substance, which is equal to or at least does not exceed the first concentration C1.

The system 1 further comprises a separation module, which in this example is in the form of a separation duct 20 operable to produce two fluid products separated from each other, one being the second fluid F2, which as mentioned above has the concentration C2 of the particles substance which is essentially less than C3, a separated-fluid product F4, in which the concentration of the particles substance is higher than C3.

The pre-treatment module comprises:

At least one first inlet 11—to receive first fluid F1 in which pre-treatment is required. The pre-treatment of the first fluid F1 is configured to transform some pre-determined types of particles into aggregates.

At least one chamber wherein said pre-treatment process is conducted. The pre-treatment process is designed specifically for the particles which are targeted to be separated in the separation duct. A variety of technology can be used, but are not limited to: injection of at least one aggregating agent through an inlet into the at least one chamber of said pre-treatment module; exposing said first fluid to at least one non-agent treatment, such as heating, cooling, radiation in said at least one chamber; mixing; aging and so forth. In some embodiments, said system comprises more than one pre-treatment module that are connected to each other either in parallel or serially, thus enabling performing repeated multiple pre-treatment processes.

At least one pre-treatment outlet 21—to dispose the pre-treated fluid F3 comprising aggregates to a downstream module.

Figure 2:
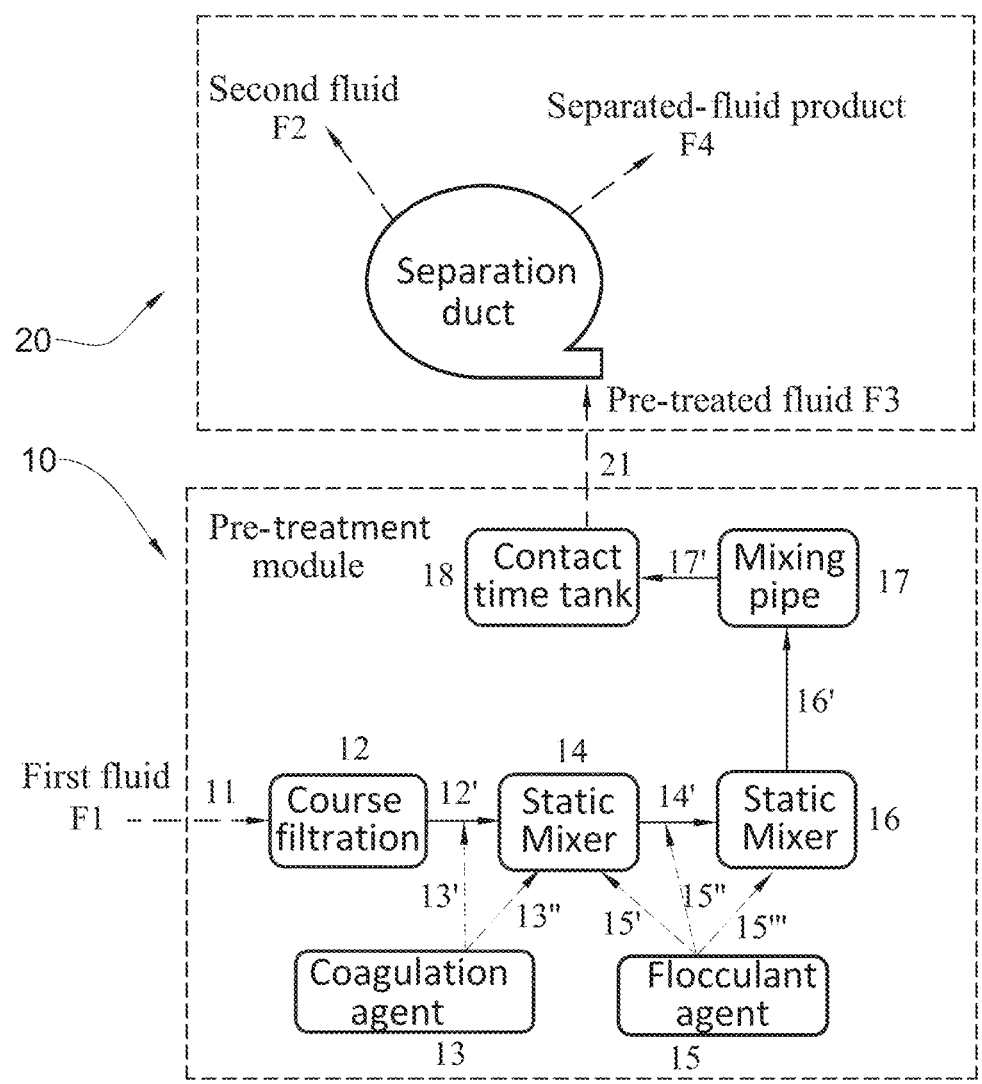
FIG. 2 is a block-diagram schematically illustrating an example of a pre-treatment module, which can be used in the system of FIG. 1.

An embodiment of a system of the present subject matter is depicted in FIG. 2, for treating surface water F1. Units 12-18 depict the pre-treatment module 10 and unit 20 depicts the separation duct 20 and separation method. Raw water (surface water, first fluid) F1 having concentration C1, is injected into a coarse filtration unit 12, the first unit of the pre-treatment module 10, via first inlet 11. Coarse filtration unit 12 is used to filter out any large particles of the F1 fluid, the size of particles to be filtered out prior to separation duct 20 is predetermined by user. Pre-treatment module 10 can include also static mixing units 14 and 16 to which a coagulating agent 13 can be injected (via injector 13' and/or 13") and a flocculating agent 15 can be injected (via injector 15' and/or 15" and/or 15'''), respectively. After said coarse filtration the fluid is transferred to static mixers via 12' and 14', respectively. Coagulating agent and Flocculating agent can be injected to said filtered fluid either prior to or in said static mixer units, respectively (dashed lines represent optional injection inlets). After mixing the filtered fluid with said agents the mixed fluid can be transferred via 16' to mixing pipe 17, after which the mixed fluid can be transferred to a contact time tank 18, wherein the mixed fluid further reacts with the agents injected therein to further aggregate the particles of said F1. Separation duct is depicted in unit 20. Pre-treated fluid F3 coming out of the pre-treatment module 10 can be injected via 21 into separation duct 20. During the separation, at least two fluids are produced:

a second fluid F2 having concentration C2, which can be introduced into a second fluid tank via at least one main duct outlet 22; and a separated fluid product F4, which can be discharged into a collection tank or can be recycled (e.g. by introducing into another separation process). In some embodiments, (for example when first fluid F1 is from a municipal wastewater source, having heavy sludge separated product) further processing of the separated fluid product F4 can be by a drain unit that can comprise a clarifier unit (wherein the sludge produced is gravitationally separated from fluid) said sludge can be separated into a sludge tank.

Turning to FIG. 1, the separation duct 20 has a central line X corresponding to the flow direction and it can comprise a plurality of duct portions of different types (30, 40, 50), each extending along a part of the duct's length along the central line X, for controlling parameters of the fluid passing along the duct, in order to facilitate the accumulation and further aggregation of the particles substance therein, for their extraction from the separation duct as a part of the separated fluid product F4. Depending on the general geometry of the separation duct, the geometry of the duct portions along the central line X can also vary, as well as their number, types and order.

In general, the duct portions of different types extend along different segments of the central line X of a separation duct according to the presently disclosed subject matter. Examples of such types all having a common basic polygonal shape in their cross-section taken perpendicularly to the central line X and differing in the presence or absence of additions/variations to this shape, can be at least as follows: a main-channel type 30 having a regular polygonal cross-sectional shape, a bay-portion type 40 having at least one irregularity relative to the regular polygonal shape, and a partitioned-portion type 50 having at least one partition separating a fluid flow passing through this portion into at least two separate flows. Normally, a duct portion of the bay-portion type 40 (hereinafter: 'the bay portion') can be located downstream to a duct portion of the main-channel type 30 (hereinafter: 'the main channel portion'), and a portion of the partitioned-portion (hereinafter: 'the partitioned portion') 50 can be located downstream to the bay portion 40 or downstream to the main channel portion 30 if there is no bay portion therebetween.

The geometry of the portions and their disposition relative to each other can be configured as desired, e.g. such as to provide, at least along some of these portions, a desired laminar flow of a fluid. Transitional areas or portions can be provided between adjacent duct portions to allow smooth transfer of fluid from one duct portion to another in order to preserve a continuous fluid flow with pre-defined characteristics.

Figure 3A:
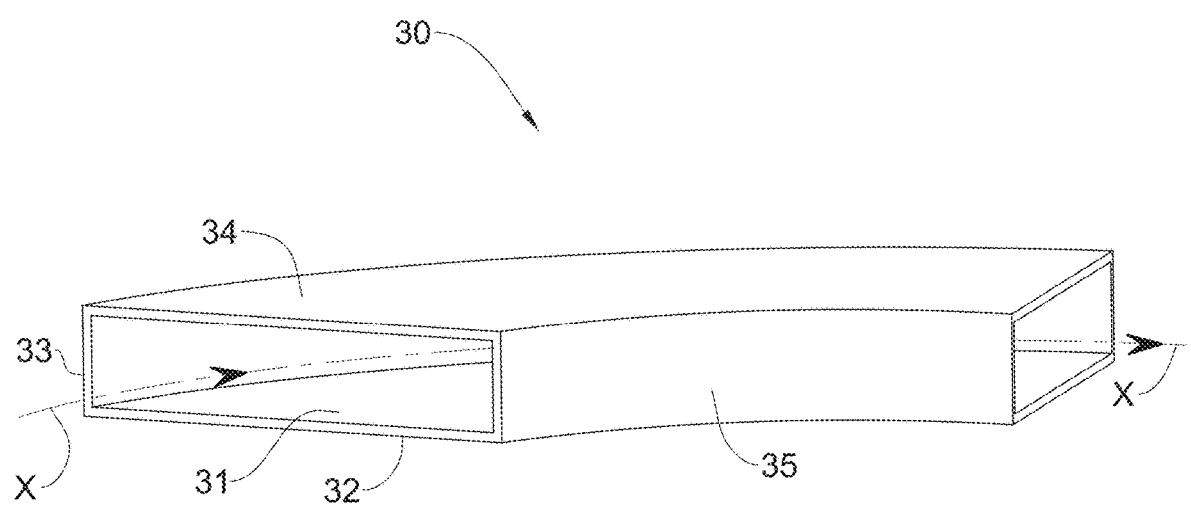
FIG. 3A is a schematic illustration of one example of a main channel portion of a separation duct, which can be used in the system of FIG. 1.

In the described example of FIG. 1, the separation duct 20 has duct portions of all the above types, and their examples are illustrated in the following drawings: FIG. 3A illustrating one example of a main channel portions 30, FIG. 3B illustrating one example of a bay portion 40, and FIG. 3C illustrating one example of a partitioned portions 50.

Figure 3B:
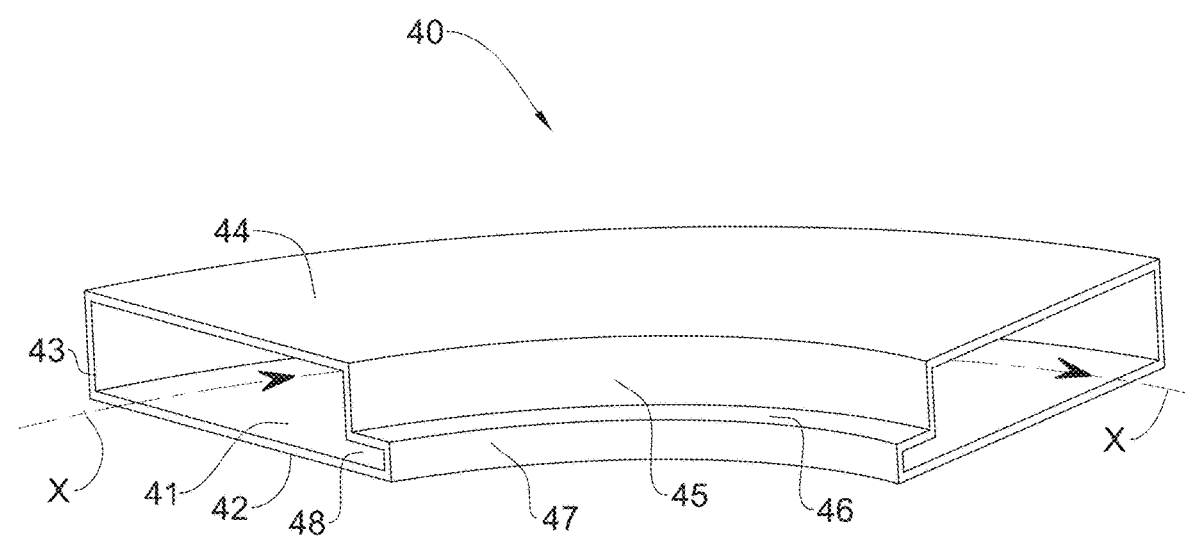
FIG. 3B is a schematic illustration of one example of a bay portion of a separation duct, which can be used in the system of FIG. 1.

As seen in FIGS. 3A, 3B and 3C, the main common feature between the three bay portions 30, 40 and 50 is that they all have a main channel, which is designated as 31 in FIG. 3A, 41 in FIG. 3B and 51 in FIG. 3C, though its cross-sectional area varies between these portions, decreasing towards the end of the partitioned portion. The main channel of each duct portion 30, 40, 50 has a basic rectangular shape in the cross-section of the duct portion taken perpendicular to the central line X, with a lower wall 32, 42, 52, an upper wall 34, 44, 54, and two side walls extending therebetween, with a dimension between the side walls being essentially greater than that between the upper and lower walls. In particular, the ratio between the former and the latter dimensions can be at least 5:1, more particularly, at least 10:1, and still more particularly, at least 15:1. Since in the described examples, the duct portions are curved, a generally convex side wall 33, 43, 53 of each duct portion 30, 40, 50 constitutes its outer side wall and a generally concave side wall 35, 45, 55 of each duct portion 30, 40, 50 constitutes its inner wall, respectively.

The main difference between the main channel portion 30, the bay portion 40 and the partitioned portion 50, is in that whilst the main channel 31 of the main channel portion 30 occupies the entire cross-sectional area thereof, the main channel 41 of the bay portion 40 shares the cross-sectional area thereof with a bay channel 48 having an essentially smaller cross-sectional area than that of the main channel 41, and the main channel 51 of the partitioned portion 50 shares the cross-sectional area thereof with partitioned channels 59, with the total cross-sectional area of the partitioned channels being essentially smaller than that of the main channel 51.

Duct portions of the same type can have different lengths and can differ in their cross-sectional geometry depending on their location along the central line X. Thus, whilst any portion of the main channel type of a generally rectangular cross-sectional shape will look similar to the main channel portion 30 shown in FIG. 3A, bay-type portions with similar main channels and partitioned-type portions with similar main channels can essentially differ from each other.

In the example of the bay portion 40 shown in FIG. 3B, the bay channel 48 protrudes from the inner channel wall 45 of the main channel 41 away from the central line X and it has bay walls 46, 47, 42 generally parallel to the corresponding walls of the main channel 41 oriented in the same way. Namely, the bay walls 46, 47, 42 are parallel or coincide to the respective channel walls 44, 45, 42. The area of the bay channel 48 is smaller than that of the main channel 41 and some of its walls have lengths that are shorter than those of the corresponding walls of the main channel. The dimension of the bay channel between its inner and outer walls can be essentially greater than that between its upper and lower walls. In particular, the ratio between the former and the latter dimensions can be at least 5:1, more particularly, at least 10:1, and still more particularly, at least 15:1. There can be more than one bay channels in a single bay portion and each of the bay channels can have a configuration different from that shown in FIG. 3B. For example:

a bay channel can be located at either the upper or lower walls of the channel, essentially close to the inner or outer walls;

a bay channel can be located at different heights along the inner or outer walls of the main channel;

the width or length of the bay channel can vary; and the number of walls of the bay can change, for example, the bay channel can have a stepped shape at its cross-section.

In the example of the partitioned portion 50 shown in FIG. 3D, having the main channel 51, it further has partition walls 53a, 55a, extending between the upper and lower walls 54, 52 of the main channel 51 and located closer to the inner wall 55 and the outer wall 53 than to the central line X of the main channel 51, with the location of the partition 55a corresponding to that of the bay channel. Partitioning the duct channel into the partitioned channels 58 and 59, enables the continuation of the fluid flow along the main channel 51 and along the partitioned channels while preventing the return of particles accumulated close to the inner and/or the outer wall of the main channel 51 or within the bay channel 58 back to the main channel 51. Locating the partitions walls farther from the central line X and closer to the main channel or the bay channel, allows for keeping more of the clean fluid which will turn into the second fluid, with a lower concentration of the substance, within the main channel.

Thus, where there is more than one bay channel along the duct length, they can vary in number, location and dimensions of their bay channels, and where there are more than one partitioned portions throughout the duct, they can vary in the number and locations of their partitions and thus dimensions of their partitioned channels.

The duct portions can differ not only by their shape in the cross-section taken perpendicular to the central line but also in their shape in a cross-section taken along the central line perpendicular to the inner and outer duct walls. In addition or alternatively, they can also differ by the shape of the central line, e.g. its radius of curvature, and/or by their extension along the central line. Thus, in a duct or a part thereof having a radius of curvature R, different portions and different duct segments can have a different angular span r.

In general, a separation duct in the system according to the presently disclosed subject matter should comprise, in addition to any duct portions it might have, the following:

a duct inlet 21 configured to receive therefrom the pre-treated fluid F3;

a main duct outlet 22, from which the second fluid F2 is to be discharged; and one or more auxiliary duct outlets O1, O2 . . . to On configured to discharge therefrom the entire or a part of the separated-fluid product F4, which has higher concentration of the particles substance C4 compared to that in the pre-treated fluid F3.

Alternatively, the main duct outlet 22 can be configured to discharge therefrom the separated-fluid product F4, whilst one or more of the auxiliary duct outlets can be configured to discharge therefrom the second fluid F2, for example, in a system in which the separated-fluid product is the main product which is requested to be produced out of the incoming first fluid (e.g. precious metal, recycling of dissolved liquid).

In the described example shown in FIG. 1, the separation duct 20 has a number of clusters of the duct portions successively arranged along the central line X having a spiral shape. Each cluster includes at least one duct portion of each of the above types and occupying at least a majority of one turn of the spiral so that the duct inlet 21 is associated with the most upstream main channel portion 30, the main duct outlet 22 is associated with the main channel 51 of the most downstream partitioned portion 50, from which the second fluid F2 is to be discharged; and the auxiliary duct outlets O1 to On are associated with the partitioned channels of the partitioned portion 50 of each cluster in order to successively discharge therefrom portions of the separated-fluid product F4.

In general, a system according to the presently disclosed subject matter can have one or more pre-treatment modules 10 and one or more separation ducts 20, and depending at least on the pre-determined parameters of the first fluid F1 (including the substance to be separated therefrom) intended to enter the system, desired parameters of the second fluid F2 exiting the system, and operational parameters dictated by the required environment of operation and working standards, it should be designed so as to ensure that parameters of the pre-treated fluid F3 (and, more particularly, of its aggregates), entering the or each separation duct 20 are in correlation with the geometry of this duct including that of its duct portions and its auxiliary outlets for the separated-fluid product F4.

The following are some examples of parameters that can be used/taken into account when designing the system.

Fluid flow parameters, such as flow rate, viscosity, velocity, temperature and pressure, which the fluid flow is expected to have when entering or while flowing along the separation duct(s).

For example, systems according to the presently disclosed subject matter can be designed to operate with fluids having a viscosity in the range of 0.1 to 2000 (cP), velocity in the range of 0.5 to 10 m/s, temperature in the range of 0 to 100° C., and pressure in the range of 1 to 10 m per unit, at relatively high flow rates of at least 50 Littre/Hour, more particularly, at least 500 Littre/Hour, and still more particularly, at least 1000 Littre/Hour;

Parameters and nature of particles suspended/dissolved in the first fluid F1 such as, e.g. their sizes and specific weights, their chemical nature (organic or inorganic), the nature of the fluid source (e.g. municipal waste water, surface water);

Desired ratio between the concentration C2 of the substance of the particles within the second fluid F2 and the concentration C1 of the substance within incoming first fluid F1; for example, this ratio can be in the range 0.01 to 0.99, and more particularly, in the range 0.1 to 0.95;

Desired ratio between the concentration C2 of the substance of the particles within the second fluid F2 and the concentration C3 of the substance within the pre-treated fluid F3; for example, this ratio can be in the range 0.01 to 0.99, and more particularly, in the range 0.1 to 0.95;

Desired ratio between the concentration C4 of the substance of the particles within the separated-fluid product F4 and the concentration C1 of the substance within the incoming first fluid F1;

Parameters of the aggregates in the pre-treated fluid F3, relative to those of the particles in the first fluid F1.

The specific weight of a particle can be higher than the specific weight of the fluid carrying it, however, when it is surrounded by a layer of air, the effect of the air in reducing the gross specific weight of the particle plus air, can be substantial.

The pre-treatment module(s) can be designed to produce such aggregates in the pre-treated fluid F3 such that their minimal/average size can be greater by a number of times, and, more particularly, by an order of magnitude than a respective minimal/average size of the particles in the first fluid F1. For example, a ratio between the minimal/average size of the particles in the pre-treated fluid F3 and that in the first fluid F1 it can be in the range between 2 and 20, more particularly, 5 and 15, and still more particularly, 8 and 12; in one specific example, with the latter size being 1 μm, the former size can be 10 μm.

Turning to FIG. 4, a process of designing the system 1 with its pre-treatment module 10 and separation duct 20 can be recursive, i.e. it can include repeating some of the design steps of both the pre-treatment and the separation duct. The design steps can include performing fluid flow analysis, particles/aggregates tracing, simulations and trial and error experiments. For example, the system design can comprise at least a part of the following steps:

Step 101—obtaining initial parameters of the first fluid, such as flow rate, velocity, pressure, and chemistry limitations, and information about the substance to be separated, desired separation, and flow rate of the second fluid;

Step 102—studying further parameters of the first fluid and the substance, if necessary, and considering at least one pre-treatment process and corresponding parameters of aggregates that can be obtained therefrom;

Step 103—characterizing a separation duct that can produce the desired flow rate with a geometry that can possibly fit the pre-treated fluid and aggregates that can be obtained in the or each considered pre-treatment process;

Step 104—in case there exist a number of separation ducts that have been designed in advance, perform step 104' of selecting the pre-treatment process that can fit the existing separation ducts, otherwise, perform step 104" of designing a separation duct (a single duct or an array) for producing the desired fluid flow and substance separation parameters;

Step 105—simulating the system, e.g. the flow of the pre-treated fluid within the selected duct;

Step 106—in case the desired separation rate is not achieved or in order to further optimize the system so as to improve the efficiency of the separation or flow rate, the following steps 106" can be repeated or added:
adjust the pre-treatment process, by changing its conditions (e.g. ratios of pre-treatment agents, pre-treatment units) or number of steps, in order to enlarge or aggregate particles;
adjust the separation duct geometry including its dimensions and arrangement and geometry of the duct portions thereof;
connect a plurality of separation ducts in a parallel and/or in a serial.

Reverting to the spiral character of the separation duct 20 as shown in FIG. 1, it should be indicated that, in general, particles suspended in the fluid flowing in such spiral duct are known to be subjected to inertial and centripetal forces. Due to the inertia momentum, the particles tend to maintain their direction of movement along the central line of the duct, and due to the centripetal forces, they will tend to become distributed in the radial direction in accordance with their weights. For example, heavy and large particles would normally tend to move to the vicinity of the outer wall of a curved duct, while and light and small particles would normally be pushed away by the fluid towards the inner channel wall.

Figure 5A:
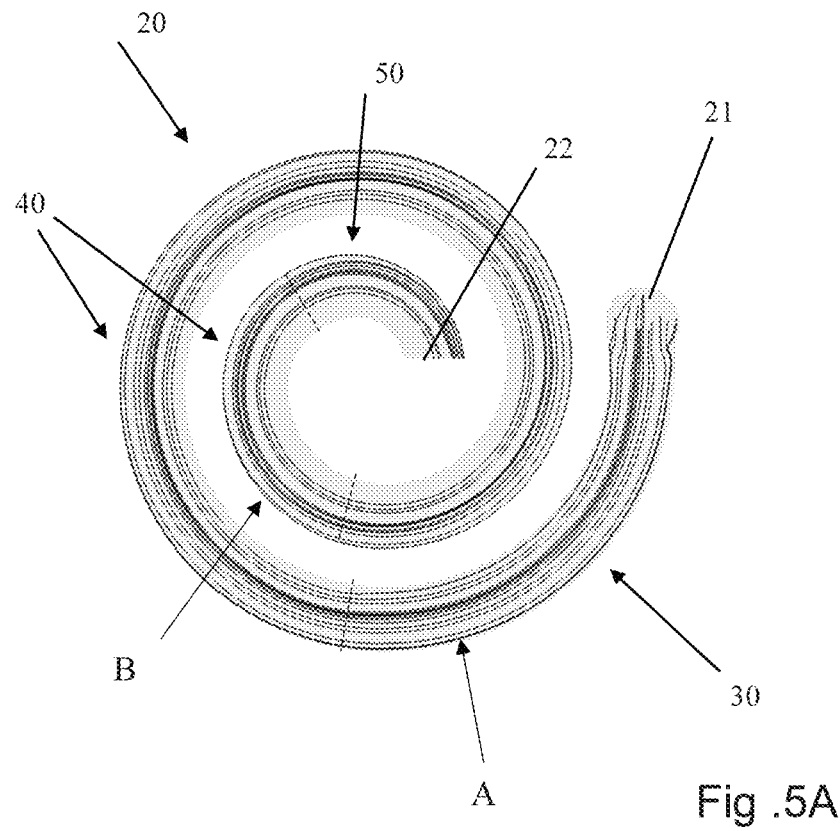
FIG. 5A is a schematic illustration of particles/aggregates distribution, which can be obtained in a separation duct of the system shown in FIG. 1.
Figure 5B:
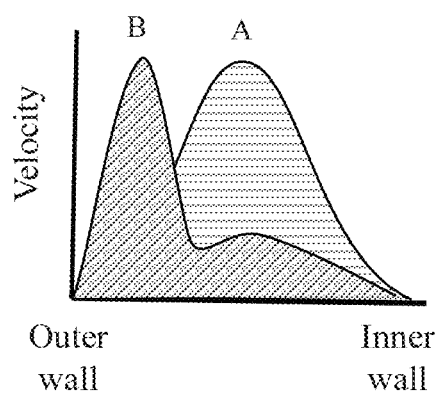
FIG. 5B is a schematic graph of a fluid flow velocity change when introducing a bay portion shown in FIG. 3B.

FIGS. 5A and 5B illustrate an example of such varying distribution of particles within a separation duct having one main portion 30, one bay portion 40 and one partitioned portion 50 of the kind described above with respect to the spiral separation duct 20. Graph B in FIG. 5B, illustrates the shift of the maximum velocity position towards the outer wall of the duct along the bay portion, compared to that along the main channel portion illustrated in graph A. In such duct, provision of the partitioned portion 50 downstream to the bay portion 40, with the partitioned channels 58, 59 disposed in accordance with the distribution of particles in the bay channel, enables the continuation of the fluid flow along the main channel 51 and along the partitioned channels while preventing the return of particles moving close to the inner and/or the outer wall of the main channel 51 back to the main channel 51. Locating the partitions walls farther from the central line X and closer to the main channel, allows for maintaining a greater amount of the second fluid within the main channel 51.

The above explanations regarding the behavior of particles in a fluid flowing along a spiral duct illustrated in FIG. 5A, is fully applicable to the behavior of the pre-treated fluid F3 with aggregates in such duct, with the difference being that the geometry of the duct can be selected so that, while tending to accumulate along different walls of the duct, the aggregation process of the aggregates can continue so that their minimal/average size will increase during their travelling along the duct until they are extracted within the separated-fluid product F4. The process of accumulating and extracting aggregates can be repeated a number of times along the duct. The same type of aggregates as well as particles of a different substance can be extracted in multiple places in order to capture those not captured in the upstream duct portions.

In addition to the structures of duct portions described above, or alternatively, the duct according to the presently disclosed subject matter can have, in at least one segment thereof, inner and outer walls, at least one of which has, in a cross-sectional plane of the segment passing through the central line and crossing the walls, a profile defined by a varying distance between the corresponding wall and the central line. These variations can help in controlling the velocity and pressure distribution of the fluid, maintaining a laminar characteristic within the channel and, particularly, in accumulating particles and aggregates suspended in it.

Figure 6:
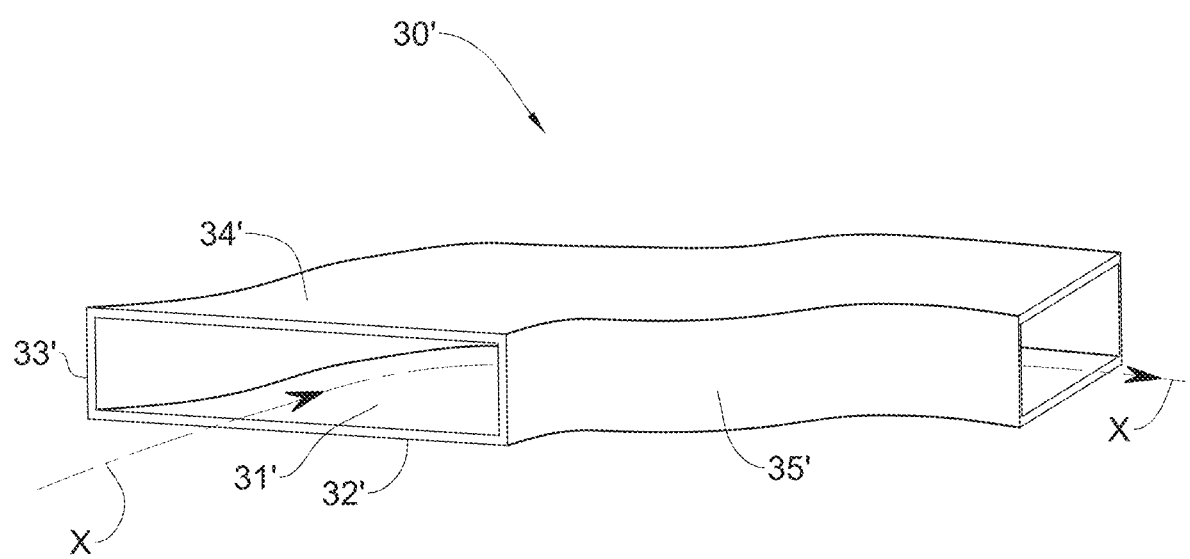
FIG. 6 is a schematic illustration of another example of a main channel portion of a separation duct, which can be used in the system of FIG. 1.

Example of one such segment is shown in FIG. 6, where a segment 30' has inner and outer duct walls 35' and 33', which in its cross-sectional plane passing through the central line X' and crossing the walls 35' and 33', have a profile defined by a varying distance between the corresponding wall and the central line X'. More particularly, each of the inner and outer walls 35' and 33' has an undulating shape.

A plurality of particles separation ducts, with portions as described above, can be used in parallel, serial, or in combination of these, in order to produce the second fluid with pre-defined parameters for the separation system.

Connecting multiple separation ducts in parallel, downstream to the pre-treatment module, allows for producing a second fluid in higher flow rate. In such parallel duct system, the pressure is similar at the inlet of each of the ducts and the flow rate is calculated as the sum of the flow rates within the ducts.

Connecting multiple separation ducts in a continuous serial form, configured to feed the residual fluid into the next separation system, helps in producing a higher separation rate due to a continuous separation of the fluid that flows within the main channel. In such serial duct system, the pressure is the sum of pressures within the connected ducts and the flow rate is similar within the continuous serial ducts.

The invention claimed is:

1. A method for producing from a first fluid having particles of a substance suspended or dissolved therein with a first concentration of said substance, a second fluid having a second concentration of said substance lower than the first concentration and a separated-fluid product, in which concentration of said substance is greater than that in the first fluid, the method comprising:
   providing a separation duct having a geometry suitable to receive and pass therethrough a fluid including aggregates of a predetermined range of sizes so as to produce from said fluid said second fluid and said separated-fluid product, said separation duct including a bay portion extending at least partially along a curved central line defining a fluid flow direction, said bay portion comprising a main channel and at least one bay channel at least partially coextensive with the main channel, the at least one bay channel having, in a cross-section of the bay portion taken perpendicularly to said central line, an area which is smaller than an area of the main channel in said cross-section;
   producing a pre-treated fluid comprising aggregates of said sizes formed from a part of said particles and a remaining part of said particles, by pre-treating said first fluid;
feeding said pre-treated fluid into said separation duct and letting said pre-treated fluid pass therealong so as to produce from said pre-treated fluid said second fluid and said separated-fluid product;
   wherein producing said separated-fluid product comprises accumulating at least some of the remaining part of said particles within the at least one bay channel.

2. The method according to claim 1, wherein said bay portion is a part of a spiral, and wherein in said cross-section the main channel has at least four channel walls including an outer channel wall and an inner channel wall, and the at least one bay channel protrudes from the inner channel wall.

3. The method according to claim 1, wherein said pre-treating includes at least one of reacting said first fluid with at least one pre-treatment agent wherein said at least one pre-treatment agent is selected from at least one coagulating agent, at least one flocculating agent or a mixture thereof; changing the temperature of said first fluid; subjecting said first fluid to magnetic field; subjecting said first fluid to radiation, subjecting said first fluid to electricity, subjecting said first fluid to a kinetic energy; or subjecting said first fluid to sound wave.

4. The method according to claim 1, wherein said aggregates suspended in said pre-treated fluid have the size of at least about 10 μm and/or said first fluid and pre-treated fluid have a particle to aggregate size ratio of at least about 2.

5. The method according to claim 1, wherein at least one of the following requirements is met:
   a ratio between the substance concentrations of said second fluid and said pre-treated fluid is at most about 0.9;
   a ratio between the substance concentrations of said second fluid and said first fluid is at most about 0.9; or
   a ratio between the substance concentrations of said separated-fluid product and said first fluid is at least about 1.1.

6. The method according to claim 1, wherein said separated-fluid product and said pre-treated fluid have an aggregate size ratio of at least about 1.1.

7. The method according to claim 1, wherein feeding pressure of said pre-treated fluid into the separation duct is at least about 1 m.

8. The method according to claim 1, wherein at least one of the following parameters of said separation duct or the pre-treatment is selected so as to obtain a pre-determined value of the concentration of said substance in the second fluid: a separation duct length, separation duct cross-section, main channel measurements, velocity of fluid in said duct, duct inlet pressure, aggregate size in the pre-treated fluid, aggregate weight in the pre-treated fluid, residence time of the first fluid in at least one pre-treatment module where the pre-treatment is performed, or any combinations thereof.

9. The method according to claim 1, wherein the at least one bay channel comprises a bay channel inlet in fluid communication with the main channel and a bay channel closing wall opposite said bay channel inlet.

10. The method according to claim 1, wherein the curved central line has a center of curvature, said at least one bay channel extending between the curved central line and the center of curvature.

11. The method according to claim 1, wherein the remaining part of said particles are lighter in weight than the aggregates.

\* \* \* \* \*